United States Patent
Wu et al.

(10) Patent No.: US 9,015,072 B2
(45) Date of Patent: Apr. 21, 2015

(54) METHOD AND APPARATUS FOR AUTOMATED INVENTORY MANAGEMENT USING DEPTH SENSING

(71) Applicant: Xerox Corporation, Norwalk, CT (US)

(72) Inventors: Wencheng Wu, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/970,371

(22) Filed: Aug. 19, 2013

(65) Prior Publication Data

US 2015/0052029 A1    Feb. 19, 2015

(51) Int. Cl.
    *G06Q 10/00*    (2012.01)
    *G06Q 10/08*    (2012.01)
(52) U.S. Cl.
    CPC ................... *G06Q 10/087* (2013.01)
(58) Field of Classification Search
    CPC ................................................. G06Q 10/087
    USPC .......................................................... 705/28
    See application file for complete search history.

(56) References Cited

U.S. PATENT DOCUMENTS

| | | | |
|---|---|---|---|
| 2008/0077511 A1* | 3/2008 | Zimmerman | 705/28 |
| 2008/0215462 A1* | 9/2008 | Sorensen et al. | 705/28 |
| 2009/0248198 A1* | 10/2009 | Siegel et al. | 700/231 |
| 2010/0039513 A1* | 2/2010 | Glickman et al. | 348/143 |
| 2010/0169190 A1* | 7/2010 | Allison et al. | 705/28 |
| 2013/0182904 A1* | 7/2013 | Zhang et al. | 382/103 |

OTHER PUBLICATIONS

Litomisky, Krystof. Consumer RGB-D Cameras and their Applications. University of California, Riverside. Spring 2012. Retrieved at http://alumni.cs.ucr.edu/~klitomis/files/RGBD-intro.pdf.*

Mason, Julian; Marthi, Bhaskara; Parr, Ronald. Object Disappearance for Object Discovery. Intelligent Robots and Systems (IROS), 2012 IEEE/RSJ International Conference on; Jan. 2012. Retreived at http://www.cs.duke.edu/~parr/iros12.pdf.*

* cited by examiner

Primary Examiner — Scott Zare

(57) ABSTRACT

A method, non-transitory computer readable medium, and apparatus for managing inventory are disclosed. For example, the method monitors a region of interest to determine an inventory level based upon a depth image captured by a depth sensing device, calculates a change in a depth in the region of interest from the depth image that is captured and determines a change in the inventory level associated with the change in the depth of the region of interest.

10 Claims, 4 Drawing Sheets

METHOD AND APPARATUS FOR AUTOMATED INVENTORY MANAGEMENT USING DEPTH SENSING

The present disclosure relates generally to inventory management and, more particularly, to a method and an apparatus for automated vision-based inventory management using RGBD cameras.

BACKGROUND

Retailers have used video and sensing technology for decades to capture and store video footage for security to protect employees and customers. However, the use of the video footage in the retail setting have been expanded from security to monitor consumer behavior and experience that can be data mined for the benefit of the retailer. Slight improvements in efficiency or customer experience may have a large financial impact for the retailer.

For certain retailers, such as supermarkets or grocery stores, managing inventory may be a time consuming process. Typically, an employee must go around and manually check the inventory for each item on each shelf manually. Some attempts have been made to automate the process with robotic devices that replace the employee. However, robotics can be very expensive and cost-prohibitive to implement. In addition, the size of the robots may be restrictive if the isles or space within the retail establishment is limited making maneuvering of the robot difficult.

SUMMARY

According to aspects illustrated herein, there are provided a method, a non-transitory computer readable medium, and an apparatus for managing inventory. One disclosed feature of the embodiments is a method that monitors a region of interest to determine an inventory level based upon a depth image captured by a depth sensing device, calculates a change in a depth in the region of interest from the depth image that is captured and determines a change in the inventory level associated with the change in the depth of the region of interest.

Another disclosed feature of the embodiments is a non-transitory computer-readable medium having stored thereon a plurality of instructions, the plurality of instructions including instructions which, when executed by a processor, cause the processor to perform operations that monitors a region of interest to determine an inventory level based upon a depth image captured by a depth sensing device, calculates a change in a depth in the region of interest from the depth image that is captured and determines a change in the inventory level associated with the change in the depth of the region of interest.

Another disclosed feature of the embodiments is an apparatus comprising a processor and a computer readable medium storing a plurality of instructions which, when executed by the processor, cause the processor to perform an operation that monitors a region of interest to determine an inventory level based upon a depth image captured by a depth sensing device, calculates a change in a depth in the region of interest from the depth image that is captured and determines a change in the inventory level associated with the change in the depth of the region of interest.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for managing inventory. As discussed above, managing inventory may be a time-consuming process for retailers. Typically, an employee must go around and manually check the inventory for each item on each shelf manually. Some attempts have been made to automate the process with robotic devices that replace the employee. However, robotics can be very expensive and cost prohibitive to implement. In addition, the size of the robots may be restrictive if the isles or space within the retail establishment is limited making maneuvering of the robot difficult.

One embodiment of the present disclosure provides a method and apparatus for managing inventory automatically. In one embodiment, depth cameras or sensors may be used to capture depth images. The depth images may be analyzed to determine a change in depth indicating that an item has been taken, sold, moved, and the like.

In one embodiment, the depth camera or sensor may be used in combination with a red green blue (RGB) camera (e.g., an RGB-D camera) to identify different items that may be displayed next to one another. The RGB image captured by the RGB-D system may be used in combination with the depth image of the depth camera or sensor to identify a particular item from multiple different items. As a result, using the RGB-D image or the depth image in combination with the RGB image, the retailer may automatically manage its inventory.

Figure 1:
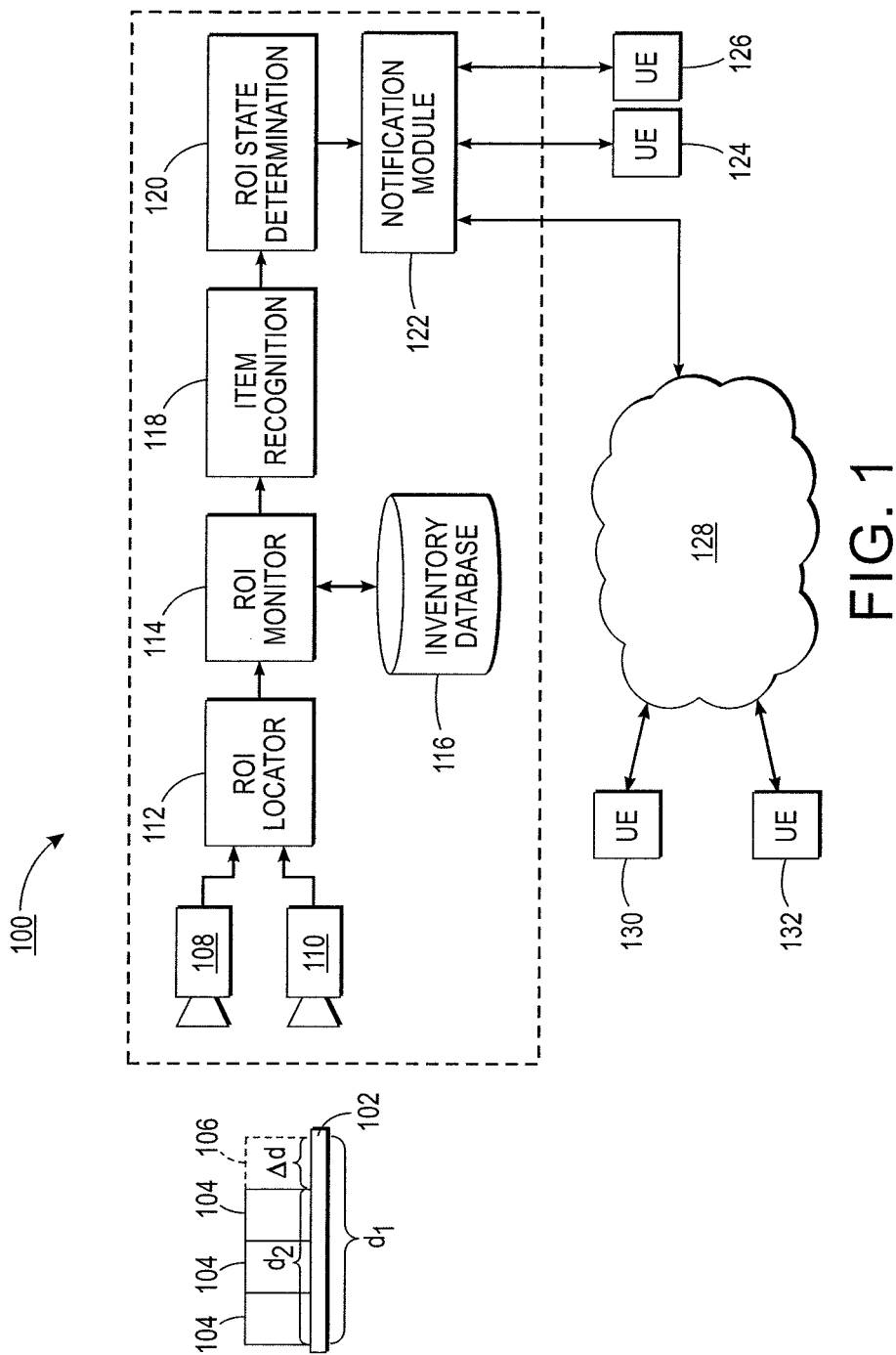
FIG. 1 illustrates an example system for managing inventory.

FIG. 1 illustrates an example system 100 for managing inventory. In one embodiment, the system 100 includes a depth sensing device 108, an RGB camera 110, a region of interest (ROI) locator 112, an ROI monitor 114, an inventory database (DB) 116, an item recognition module 118, an ROI state determination module 120, and a notification module 122. In one embodiment, the separate components of the system 100 may be deployed as separate modules in hardware having a processor and computer readable memory or may be deployed as a single component of an application server or similar hardware device. For example, in one embodiment the depth sensing device 108 and the RGB camera 110 may be combined as a single RGB-D camera or system and referred to as a RGB-D camera that performs both the functions of the depth sensing device 108 and the RGB camera 110 and can be used interchangeably.

In one embodiment, the RGB camera 110, the inventory DB 116 and the item recognition module 118 may be optional. For example, if only a single item is monitored, the level of inventory may be monitored by depth information obtained by the depth sensing device 108 alone.

In one embodiment, the system 100 may be in communication with one or more user endpoint (UE) devices 124, 126, 130 and 132. In one embodiment, the communication may be either a local or wired connection (e.g., UE 124 and 126) or may be over a remote or wireless connection over an Internet protocol (IP) network 128 (e.g., UE devices 130 and 132). The UE devices 124, 126, 130 and 132 may be any device capable of receiving an alarm or notification message from the system 100, such as for example, a desktop computer, a laptop computer, a smartphone, a mobile telephone, a netbook computer, a tablet computer, and the like. Although four UE devices are illustrated in FIG. 1, it should be noted that any number (e.g., more or less) of UE devices may be deployed.

In one embodiment, the depth sensing device 108 may be an image based device or a non-image based device. For example, image based depth sensing devices may include an RGB-D camera, a passive stereo camera, an active stereo camera, and the like. Examples of non-image based depth sensing devices may include a laser detection and ranging or a light detection and ranging (LADAR/LiDAR) device, a photo wave device, a time of flight measurement device, and the like.

In one embodiment, the present disclosure uses an active stereo RGB-D camera with an infrared (IR) illuminator that projects patterns of known spatial characteristics onto a scene. The RGB-D camera may have an IR monochrome camera having a 640×480 spatial resolution and reconstructs the depth map of the scene by characterizing the deformations of the known characteristics of the projected pattern as it gets reflected from the scene. The RGB-D camera may aid in a depth map reconstruction of the ROI being monitored and operate at a frame rate of 5 frames per second (fps).

In one embodiment, the depth sensing device 108 and the RGB camera 110 may be placed in a fixed location in front of an ROI (e.g., an ROI 102). In one embodiment, the depth sensing device 108 and the RGB camera 110 may be placed in front of the ROI 102 or in back of the ROI 102. In one embodiment, the depth sensing device 108 and the RGB camera 110 may be stationary or may be activated to capture a panoramic view of multiple ROIs 102 around the depth sensing device 108 and the RGB camera 110.

In one embodiment, the ROI locator 112 may determine pixel locations of areas within the images captured by the depth sensing device 108 that correspond to the ROI (e.g., a shelf region, or any other region that is being monitored for inventory management). In one embodiment, the ROI may be defined as a subset of pixels within a depth image captured by the depth sensing device 108 or the RGB image captured by the RGB camera 110. For example, the ROI may be some area within the image that is less than the entire depth image captured by the depth sensing device 108 or less than the entire RGB image captured by the RGB camera 110.

In one embodiment, a user may manually provide or outline the ROI for the ROI locator 112. In another embodiment, the ROI locator 112 may automatically detect a ROI based upon clustering algorithms, such as for example, simple k-means clustering or using image segmentation techniques based upon images captured by the depth sensing device 108 and the RGB camera 110. In one embodiment, the ROI locator 112 may only need to be run once at initialization if the depth sensing device 108 and/or the RGB camera 110 are fixed on a single ROI.

In one embodiment, the ROI monitor 114 may analyze the ROI located by the ROI locator 112 for presence of motion, change in a depth in the ROI indicating either an increase or decrease in inventory. In addition, the ROI monitor 114 may detect a presence of significant motion in the ROI that may indicate a potential occlusion (e.g., due to a customer walking through an isle) or a potential activity (e.g., a customer reaching for an item to purchase or a store employee re-stocking a shelf) is occurring.

In one embodiment, the ROI monitor 114 may perform analysis on an image for automated inventory management when there is no significant presence of motion in the ROI. For example, the analysis may be performed when the number of pixels containing motion is below a threshold (e.g., less than 5% of a total pixel count).

In one embodiment, to detect a decrease in inventory, a depth difference between a reference depth map of the ROI (e.g., from the inventory DB 116) and depth images of the currently acquired depth image video frame of the ROI may be first calculated. Optionally, the difference maps may be further processed via depth thresholding, followed by morphological filtering and physical size thresholding.

In one embodiment, when a front view of the ROI is analyzed, regions with detected positive depth difference (i.e., increase of depth due to items being removed from the shelf) are considered as regions with a decrease in inventory. The locations and the amounts of depth increase of those regions may be forwarded to the ROI state determination module 120 for further processing, as discussed below.

In one embodiment, an increase in inventory may be detected by a negative depth difference (i.e., decrease of depth due to items being added to the shelf). The amounts of the depth decrease of those regions may be forwarded to the ROI state determination module 120 for further processing, as discussed below.

In one embodiment, the back view of the ROI may also be analyzed. For example, the depth sensing device 108 and the RGB camera 110 may be located behind the items to keep the cameras out of view of the customer or hidden from the customer. As a result, increase and decrease in inventory would be opposite of the analysis performed from the front view (e.g., a positive depth difference may be an increase of inventory as items are pushed back closer to depth sensing device 108 as items are added and a negative depth difference may be a decrease of inventory as items are pulled away from the depth sensing device 108 as items are removed).

In one embodiment, the front view of the ROI may be used to measure a change in depth from the back to the front. For example, some shelves may be slanted downward to move items to the front as one is removed. Thus, the depth would increase from the back to the front as items are removed. However, if a depth from the front to the back were to be measured, no change in depth would be detected as items are removed since the next item would always be moved to the front as an item is removed.

In one embodiment, the ROI monitor 114 may also be used to determine if an item has been moved or misplaced. For example, if a change of a level of inventory for a product is detected, a comparison may be made to a database storing information of a current inventory level. If the current inventory level has not changed, then a determination may be made that the item has simply been misplaced. For example, if the item had been purchased, the current inventory level would be consistent in indicating that the inventory was reduced by a single unit.

In one embodiment, the inventory DB 116 may store information such as expected depth maps, expected item RGB image for each ROI (e.g., where an item should be located on a shelf, a proper pose for the item, and the like), a snapshot or a thumbnail image or a signature of a single item, a current inventory level for each item, and the like. For example, the RGB image may be used to identify an image that is compared to the stored images of various different items to identify which item is which in the ROI. For example, a signature image for a first brand of soft drink may be stored and a signature image for a second brand of soft drink may be stored that may be used by the item recognition module 118 to recognize a particular item, as discussed below.

In addition, the signature image may show the proper pose (e.g., placed with the label out) of a particular item. Thus, a comparison may be made with the RGB image of the item and the signature image to determine if the item is properly posed or not.

In one embodiment, the item recognition module 118 may use the signature images stored in the inventory DB 116 to recognize a particular item. For example, when a change in inventory is detected, the RGB image may be used to determine an image of the item that changed an inventory level. The image may then be compared to the signature images stored in the inventory DB 116 to determine whether the change in inventory is for the first brand of soft drink or the second brand of soft drink.

In one embodiment, the item recognition module 118 may also be used to determine if an item has been posed improperly on a shelf in the ROI. For example, the item recognition module 118 may use the signature image stored in the inventory DB 116 to also determine if the item is properly posed in the ROI.

In one embodiment, the ROI state determination module 120 may determine whether the change in inventory level of an item is normal, if there is a shortage of inventory or if the item is misplaced. For example, a threshold may be predefined that may be used to compare against the depth measured by the ROI monitor 114. For example, if the difference in depth is greater than the threshold, then the ROI state determination module 120 may determine that there is a shortage of inventory and a replenishment is required. However, if the depth is not below the threshold, the ROI state determination module 120 may determine that the state is normal and no action is required.

In one embodiment, a width of the item may be known. As a result, the total depth divided by the width of the item may be used to determine by how much the inventory level has decreased for the item. In one embodiment, this information may be used to set the threshold. For example, an inventory level of a row of soda cans is being monitored. The cans may each have a width of four inches. If a retailer wants to restock inventory when the inventory level is decreased by five cans, then the threshold may be set to 20 inches (e.g., 4 (inches/can)×5 cans=20 inches). The above threshold is only an example and any value may be used based upon a particular application or item being monitored.

In one embodiment, if an increase in depth is detected the ROI state determination module 120 may confirm a decrease of inventory with an inventory level of the item. For example, if the current inventory level has decreased by the same amount as indicated by the change in depth, the ROI state determination module 120 may confirm that the change in depth is due to a decrease in inventory. However, if the current inventory level is not different than what is indicated by the change in depth, the ROI state determination module 120 may determine that the item has been misplaced.

In one embodiment, the ROI state determination module 120 may also determine that an item is currently misplaced. For example, a first brand of soft drink may be placed in a row where a second brand of soft drink is supposed to be located. The ROI state determination module 120 may compare an expected item RGB image from the inventory DB 116 against a current RGB image to determine that an item is in the wrong location.

In one embodiment, the notification module 122 may issue an alarm or a notification message to one of the UE devices 124, 126, 130 or 132 if a shortage of inventory or a misplaced item is detected. For example, the notification may be an email, a text message, a pop-up window, an automated telephone call, a graphical image (e.g., a blinking red window), and the like. In one embodiment, the notification module may automatically contact a vendor to place an order for the item.

FIG. 1 illustrates an example ROI 102. In one embodiment, the ROI 102 may include one or more items 104. In one embodiment, a dashed line 106 indicates where an item 104 was placed at a first moment in time. Thus, the depth of the ROI including the dashed line 106 was $d_1$. However, at a second moment in time, an item 104 is removed as indicated by the dashed line 106 and the ROI has a new depth $d_2$. The difference in depth from $d_1$ and $d_2$ is represented by $\Delta d$. The system 100 described above may be used to monitor the ROI 102 and the $\Delta d$ to monitor an inventory level of a particular item 104.

Figure 2:
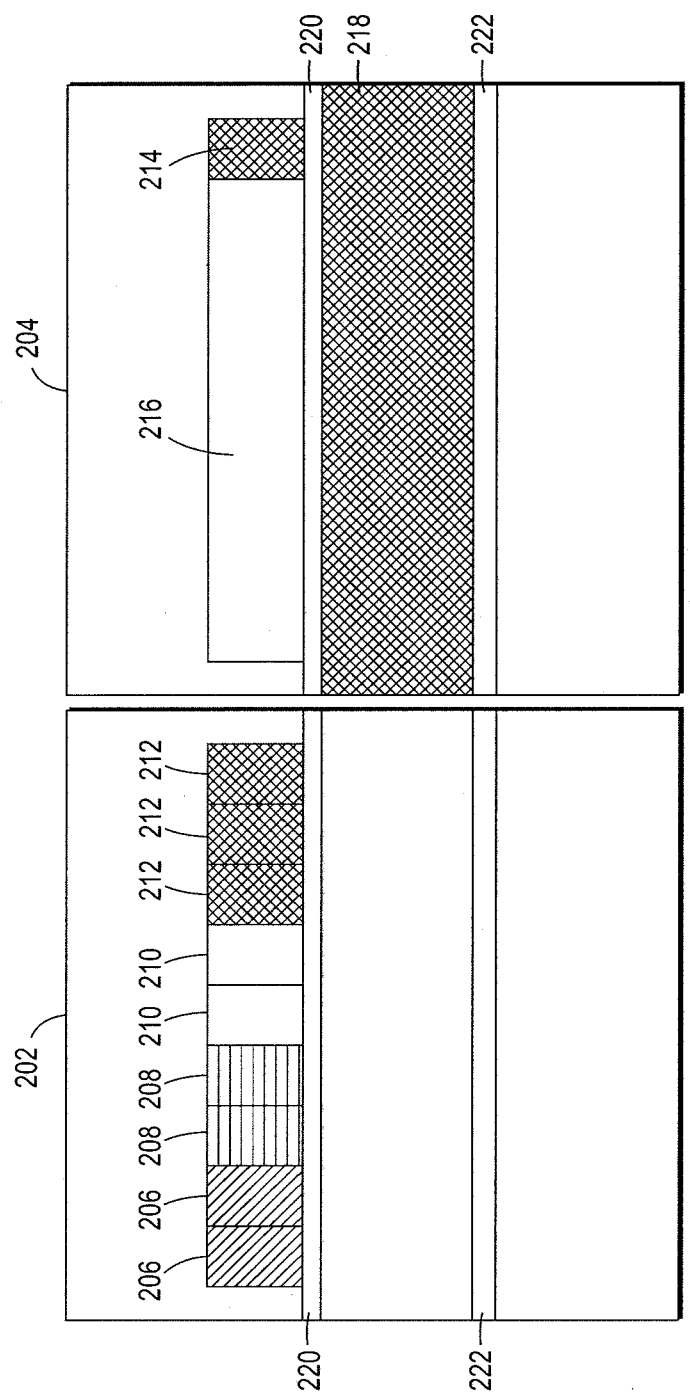
FIG. 2 illustrates an example RGB image and RGBD image.

FIG. 2 illustrates an example of an RGB image 202 and a depth image 204 captured by an image based depth sensing device (e.g., an RGB-D camera). In one embodiment, the RGB image 202 clearly shows the different items 206, 208, 210, and 212 arranged on a shelf 220. The RGB image 202 also shows a shelf 222 that is empty.

If an item (e.g., 212) is taken from the shelf 202, it may be difficult to notice the missing item using only the RGB image 202. However, the depth image 204 provides the depth of the image using various degrees of shading. For example, the darker the shade, the higher the depth value relative to the depth sensing device 108. For example, the depth image 204 shows the empty shelf 222 in complete darkness. In contrast, a region 216 of the depth image 204 is the lightest indicating that the items are closest to the depth sensing device 108. However, if an item 212 is taken from the shelf 220, the depth image 204 may indicate a change in depth with a slightly darker shading 214. As a result, a change in depth and a change in inventory may be automatically detected.

Thus, using the images captured from the depth sensing device 108 and optionally the depth sensing device 108 in combination with the RGB camera 110 and the analysis of the images performed by the system 100, a retailer, a business, a restaurant, and the like, may automatically manage its inventory levels. In addition, the system 100 may automatically determine if an item has been misplaced or is posed improperly on a shelf of an ROI. Thus, the retailer may increase efficiency to reduce costs and increase profits by automatically managing its inventory.

Figure 3:
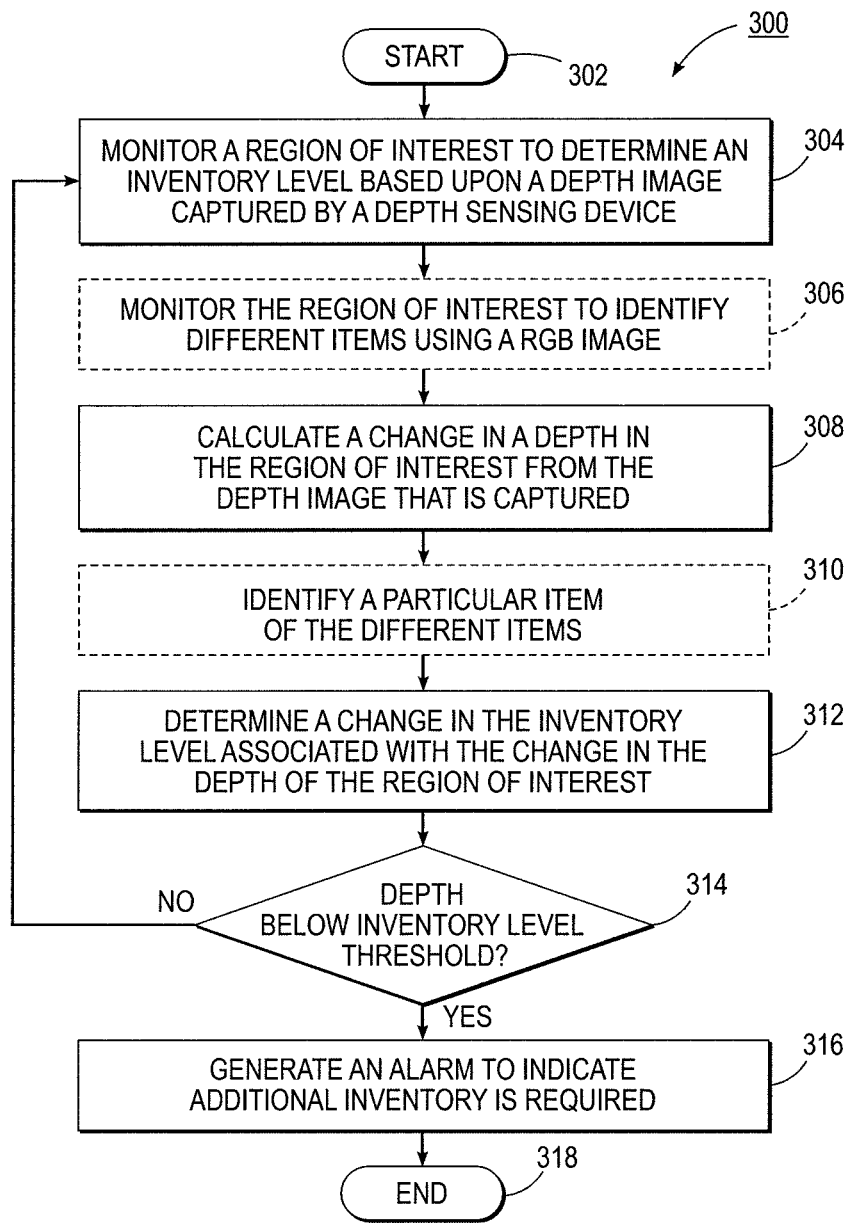
FIG. 3 illustrates an example flowchart of a method for managing inventory.
Figure 4:
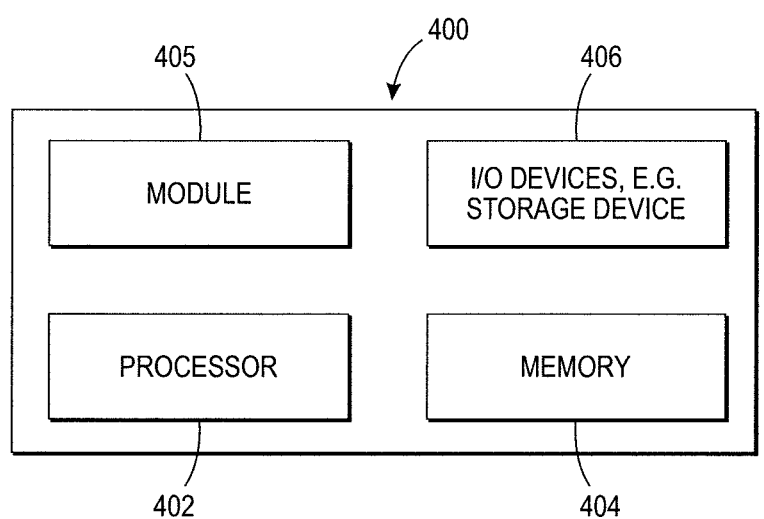
FIG. 4 illustrates a high-level block diagram of a general-purpose computer suitable for use in performing the functions described herein.

FIG. 3 illustrates a flowchart of a method 300 for managing inventory. In one embodiment, one or more steps or operations of the method 300 may be performed by the system 100 or a general-purpose computer as illustrated in FIG. 4 and discussed below.

The method 300 begins at step 302. At step 304, the method 300 monitors a region of interest (ROI) to determine an inventory level based upon a depth image captured by a depth sensing device. In one embodiment, the depth sensing device may be an image based device or a non-image based device. For example, image based depth sensing devices may include an RGB-D camera, a passive stereo camera, an active stereo camera, and the like. Examples of non-image based depth sensing devices may include a LADAR/LiDAR device, a photo wave device, a time of flight measurement device, and the like.

In one embodiment, the present disclosure uses an active stereo RGB-D camera with an IR illuminator that projects patterns of known spatial characteristics onto the scene. The RGB-D camera may be an infrared (IR) monochrome camera having a 640×480 spatial resolution and reconstructs the depth map of the scene by characterizing the deformations of the known characteristics of the projected pattern as it gets reflected from the scene. The RGB-D camera may aid in a depth map reconstruction of the ROI being monitored and operate at a frame rate of 5 frames per second (fps).

At optional step 306, the method 300 monitors the region of interest to identify different items using an RGB image. For example, an RGB camera may be used to capture an RGB image. The RGB image may be compared to signature images stored in an inventory database to identify each one of the different items in the ROI and whether or not the items have been misplaced or posed improperly, as discussed above. In one embodiment, if only a single item is being monitored RGB image may not be needed to distinguish different levels of inventory of the different items.

At step 308, the method 300 may calculate a change in a depth in the ROI from the depth image that is captured. For example, at step 308, consecutive depth images may be continuously monitored. As long as there is no significant movement detected (e.g., potential occlusions or potential activities) the method 300 may analyze the depth images to determine the change in the depth of the ROI. It should be noted that detection of motion can be achieved via analysis of the depth image, the RGB image or both using motion or foreground detection techniques. In one embodiment, the change may be a decrease in depth if items are added to the ROI or an increase in depth if items are removed to the ROI.

At optional step 310, the method 300 may identify a particular item of the different items. For example, if different items are placed in the same ROI (e.g., different brands of soda on a single shelf within the ROI) and the RGB image is used in optional step 306, the RGB image may be used to identify which item of the different items had a change in depth. In other words, the RGB image may be used to identify a particular item of the different items that has had a change in inventory level.

At step 312, the method 300 determines a change in the inventory level associated with the change in the depth of the region of interest. For example, the change in depth may correspond to an increase or decrease in the inventory level.

In one embodiment, the method 300 may determine if the change is greater than a predefined threshold. For example, there may be some noise between consecutive depth images that are captured which result in an apparent change in depth. Thus, the method may try to determine a change in the inventory level when there was actually no change in depth. However, a threshold may be set (e.g., a depth corresponding to a width of an item of inventory) to ensure that the inventory level is determined only when the change is greater than the predefined threshold to prevent unnecessary calculations for determining the inventory level associated with small changes due to noise of consecutive depth images.

At step 314, the method 300 may determine if the depth is below an inventory level threshold. For example, having a known width of an item and a desired level at which the item should be restocked, the inventory level threshold may be set. The total depth may be a function of the number items to be depleted before restocking times a width of the item. For example, if each box is one inch in width and the box should be restocked when 10 boxes have been purchased, the inventory level threshold may be set to 10 inches. This information can be extracted easily with a simple calibration procedure (e.g., by fully stocking the shelf, acquiring a depth image and then removing one item and acquiring another depth image) or directly from the inventory DB mentioned earlier.

At step 314, if the depth is not below the inventory level threshold, the method 300 may return to step 304. However, at step 314, if the depth is below the inventory level threshold, the method 300 may proceed to step 316.

At step 316, the method 300 generates an alarm to indicate additional inventory is required. For example, a notification message or alert may be sent to a user endpoint device of a manager on duty or a central warehouse to indicate that a particular item needs to be re-stocked or re-ordered. In one embodiment, the notification may be an email, a text message, a pop-up window, an automated telephone call, a graphical image (e.g., a blinking red window), and the like. At step 318, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for managing inventory, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for managing inventory can be loaded into memory 404 and executed by processor 402 to implement the functions as discussed above. As such, the present method 405 for managing inventory (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing inventory, comprising:
receiving, by a processor, a depth image video frame captured by a depth sensing device, wherein the depth sensing device comprises an image based depth sensing device comprising a red green blue depth (RGB-D) camera;
determining, by the processor, pixels that are in a region of interest of the depth image video frame;
determining, by the processor, that a number of pixels of the pixels that are in the region of interest containing motion is below a threshold;
monitoring, by a processor, the region of interest to determine an inventory level based upon the depth image video frame when the number of pixels containing motion in the region of interest is below the threshold;
calculating, by the processor, a change in a depth in the region of interest from the depth image video frame that is captured;
monitoring, by the processor, the region of interest to identify different items that are within the depth image video frame using a red green blue (RGB) image captured from the RGB-D camera based on a comparison to a corresponding signature image stored in a database;
identifying, by the processor, a particular item of the different items of the inventory that incurred the change in the depth of the region of interest; and
determining, by the processor, a change in the inventory level associated with the change in the depth of the region of interest.

2. The method of claim 1, further comprising:
generating, by the processor, an alarm when the depth falls below the inventory level threshold to indicate that an additional inventory is required.

3. The method of claim 1, further comprising:
identifying, by the processor, that the particular item of the inventory is misplaced based upon the RGB image and the depth image video frame.

4. The method of claim 1, wherein the monitoring is performed with the depth sensing device monitoring the region of interest from a front side.

5. The method of claim 1, wherein the determining comprises:
calculating a number of items of depletion in inventory based upon a width of each one of the items and the change of the depth in the region of interest.

6. A non-transitory computer-readable medium storing a plurality of instructions which, when executed by a processor, cause the processor to perform operations for managing inventory, the operations comprising:
receiving a depth image video frame captured by a depth sensing device, wherein the depth sensing device comprises an image based depth sensing device comprising a red green blue depth (RGB-D) camera;
determining pixels that are in a region of interest of the depth image video frame;
determining that a number of pixels of the pixels that are in the region of interest containing motion is below a threshold;
monitoring the region of interest to determine an inventory level based upon the depth image video frame when the number of pixels containing motion in the region of interest is below the threshold;
calculating a change in a depth in the region of interest from the depth image video frame that is captured;
monitoring the region of interest to identify different items that are within the depth image video frame using a red green blue (RGB) image captured from the RGB-D camera based on a comparison to a corresponding signature image stored in a database;
identifying a particular item of the different items of the inventory that incurred the change in the depth of the region of interest; and
determining a change in the inventory level associated with the change in the depth of the region of interest.

7. The non-transitory computer-readable medium of claim 6, further comprising:
generating an alarm when the depth falls below the inventory level threshold to indicate that an additional inventory is required.

8. The non-transitory computer-readable medium of claim 6, further comprising:
identifying that the particular item of the inventory is misplaced based upon the RGB image and the depth image video frame.

9. The non-transitory computer-readable medium of claim 6, wherein the determining comprises:
calculating a number of items of depletion in inventory based upon a width of each one of the items and the change of the depth in the region of interest.

10. A method for managing inventory, comprising:
receiving, by a processor, a depth image video frame captured by a depth sensing device, wherein the depth sensing device comprises an image based depth sensing device comprising a red green blue depth (RGB-D) camera;
determining, by the processor, pixels that are in a region of interest of the depth image video frame;
determining, by the processor, that a number of pixels of the pixels that are in the region of interest containing motion is below a threshold;
monitoring, by the processor, the region of interest to determine an inventory level of a particular item of a plurality of different items within the depth image video frame based upon the depth image video frame and a red green blue (RGB) image captured by the RGB-D camera that captures both the depth image video frame and the RGB image when the number of pixels containing motion in the region of interest is below the threshold;
detecting, by the processor, a depletion in the inventory level of the particular item due to a change in a depth of the region of interest in the depth image video frame containing the particular item identified by the RGB image based on a comparison to a corresponding signature image stored in a database;
calculating, by the processor, the depth in the region of interest after the change is detected;
determining, by the processor, when the depth is below an inventory level threshold, wherein the depth corresponds to a number of the particular item based upon a width of the particular item; and
generating, by the processor, an alarm when the depth falls below the inventory level threshold to indicate that an additional inventory of the particular item is required.

* * * * *